(12) United States Patent
Lee et al.

(10) Patent No.: US 10,310,615 B2
(45) Date of Patent: Jun. 4, 2019

(54) APPARATUS AND METHOD OF USING EVENTS FOR USER INTERFACE

(71) Applicant: Samsung Electronics Co., Ltd., Suwon-si (KR)

(72) Inventors: Kyoobin Lee, Seoul (KR); Hyun Surk Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 14/302,785

(22) Filed: Jun. 12, 2014

(65) Prior Publication Data

US 2015/0095818 A1 Apr. 2, 2015

(30) Foreign Application Priority Data

Oct. 1, 2013 (KR) .................. 10-2013-0117197

(51) Int. Cl.
*G06F 3/01* (2006.01)
*G06F 3/0488* (2013.01)
*G10L 25/48* (2013.01)
*G06F 3/16* (2006.01)

(52) U.S. Cl.
CPC ............ *G06F 3/017* (2013.01); *G06F 3/0488* (2013.01); *G06F 3/167* (2013.01); *G10L 25/48* (2013.01)

(58) Field of Classification Search
None
See application file for complete search history.

(56) References Cited

U.S. PATENT DOCUMENTS

| 7,729,808 | B2 | 6/2010 | Nasle et al. |
| 7,958,147 | B1 | 6/2011 | Turner et al. |
| 2005/0251746 | A1 | 11/2005 | Basson et al. |
| 2007/0070050 | A1* | 3/2007 | Westerman ........... G06F 3/0235 345/173 |
| 2010/0053107 | A1* | 3/2010 | Tsuzaki ................ G06F 3/0412 345/173 |
| 2011/0075891 | A1 | 3/2011 | Yokoyama et al. |
| 2011/0128374 | A1 | 6/2011 | Shellshear et al. |
| 2011/0172567 | A1 | 7/2011 | Panken et al. |
| 2011/0279682 | A1 | 11/2011 | Li et al. |
| 2012/0101967 | A1 | 4/2012 | Oliver et al. |

(Continued)

FOREIGN PATENT DOCUMENTS

| EP | 2 523 086 A1 | 11/2012 |
| EP | 2 677 500 A2 | 12/2013 |

(Continued)

OTHER PUBLICATIONS

O'Donovan, Peter. "Optical Flow: Techniques and Applications," The University of Saskatchewan, TR 502425-2005 (26 pages).

(Continued)

*Primary Examiner* — Kenneth Bukowski
(74) *Attorney, Agent, or Firm* — NSIP Law

(57) ABSTRACT

An apparatus for use interface and a method of user interface are provided. The apparatus may include a classifier configured to classify an event as corresponding to a class among at least two classes, an updater configured to update class information related to the class corresponding to the event, and a processor configured to determine a user input corresponding to the event based on the updated class information.

25 Claims, 19 Drawing Sheets

(56) References Cited

U.S. PATENT DOCUMENTS

| | | | |
|---|---|---|---|
| 2012/0109901 A1 | 5/2012 | Mase | |
| 2012/0301032 A1 | 11/2012 | Kawanishi et al. | |
| 2013/0063402 A1* | 3/2013 | Su | G06F 3/0488 345/175 |
| 2013/0229375 A1 | 9/2013 | Zhang et al. | |
| 2015/0070320 A1* | 3/2015 | Hong | G06F 3/042 345/175 |

FOREIGN PATENT DOCUMENTS

| | | |
|---|---|---|
| KR | 10-0989081 B1 | 10/2010 |
| KR | 10-1158729 B1 | 6/2012 |
| KR | 10-1171551 B1 | 8/2012 |

OTHER PUBLICATIONS

Extended European Search Report dated Feb. 12, 2015 in counterpart European Application No. EP 14181934.2 (13 pages).

* cited by examiner

APPARATUS AND METHOD OF USING EVENTS FOR USER INTERFACE

CROSS-REFERENCE TO RELATED APPLICATION(S)

This application claims the benefit under 35 USC 119(a) of Korean Patent Application No. 10-2013-0117197 filed on Oct. 1, 2013, in the Korean Intellectual Property Office, the entire disclosure of which is incorporated herein by reference for all purposes.

BACKGROUND

1. Field

The following description relates to an apparatus that provides a user interface and a method of implementing a user interface, and to an apparatus and a method that processes user input events.

2. Description of Related Art

Human-computer interaction (HCI) relates to a study of improving the interaction between a user and a computer. Various user interfaces that are available use a mouse, a keyboard, a touch screen and the like to convey the input from a user to a computer. Such a user interface may be implemented through hardware components, software components, or a combination of both.

For instance, a graphic user interface on a touch screen of a mobile terminal, such as a smart phone, may include a hardware component such as a touch screen that is used to detect the input of a user as well as a software component that provides the appropriate display of buttons or icons for the user to make choices on the touch screen.

With the widespread availability of camera, microphone, and other interactive components in electronic devices, a user interface that farther improves the interaction between a user and a computer is desirable to make full use of various functions available through the electronic devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for user interface includes a classifier configured to classify an event as corresponding to a class among at least two classes, an updater configured to update class information related to the class corresponding to the event, and a processor configured to determine a user input corresponding to the event based on the updated class information.

The classifier may be configured to classify the event as corresponding to the class among the at least two classes based on representative values corresponding to the at least two classes.

The representative values may correspond to coordinates or position-related information regarding each of the at least two classes, or to frequency, amplitude or intensity related information regarding each of the at least two classes.

The classifier may include a comparator configured to compare an event value corresponding to the event to the representative values, and a detector configured to detect a class having a representative value most similar to the event value.

The updated class information may include a representative value representing the class of the classified event.

The at least two classes may correspond to at least two objects associated with the user input.

The processor may be configured to track the at least two objects to determine the user input.

The general aspect of the apparatus may further include at least one event-based sensor configured to detect the event.

The at least one event-based sensor may include at least one of an event-based vision sensor, an event-based sound sensor, and an event-based touch sensor.

The processor may include an optical flow calculator configured to calculate optical flows corresponding to the at least two classes, and a velocity component calculator configured to calculate velocity components corresponding to the at least two classes based on the calculated optical flows.

The velocity components may include at least one of a first velocity component at which an object generating the event moves in an x-axial direction on a virtual plane used to detect an event, a second velocity component at which the object moves in a y-axial direction on the virtual plane, a third velocity component at which the object moves in a direction orthogonal to the virtual plane, and a fourth velocity component at which the object rotates on the virtual plane.

The processor may further include a recognizer configured to recognize the user input by analyzing the velocity components based on a user input context.

The processor may further include a recognizer configured to recognize the user input by analyzing a relative velocity between the class of the classified event and at least one remaining class based on the velocity components.

The processor may include a recognizer configured to recognize the user input by analyzing a representative value representing the class of the classified event and a representative value representing at least one remaining class based on a user input context.

In another general aspect, a method of user interface involves receiving a signal comprising a timestamp of an event and an identifying information of the event, selecting a class from a plurality of predetermined classes based on the identifying information, updating a representative value of the selected class based on the identifying information, updating a value of an element corresponding to the event in an event map, based on the timestamp, and determining a user input corresponding to the event based on at least one of the event map and representative values of the plurality of classes.

The identifying information of the event may include an index identifying the event, a coordinate or position-related information of the event, or frequency, amplitude or intensity related information regarding the event, and the updating may involve updating the value of the element stored in a memory.

The selecting may involve comparing the index to the representative values of the plurality of classes, and detecting a class having a representative value most similar to the index.

The determining may involve calculating a velocity vector corresponding to the updated element based on the updated element and ambient elements of the updated element, calculating a plurality of velocity components corresponding to the selected class based on the calculated velocity vector corresponding to the updated element, and recognizing the user input by analyzing the calculated plurality of velocity components.

The calculating of the velocity vector may involve calculating a time difference between the updated element and the ambient elements, calculating a distance difference between the updated element and the ambient elements, and calculating the velocity vector corresponding to the updated element based on the calculated time difference and the calculated distance difference.

The plurality of velocity components may include a first velocity component at which an object generating the event moves in an x-axial direction on a virtual plane used to detect an event, a second velocity component at which the object moves in a y-axial direction on the virtual plane, a third velocity component at which the object moves in a direction orthogonal to the virtual plane, and a fourth velocity component at which the object rotates on the virtual plane.

The calculating of the plurality of velocity components may include extracting elements corresponding to the selected class from the plurality of elements, calculating the first velocity component and the second velocity component by averaging velocity vectors of the extracted elements, calculating a central point of the selected class based on magnitudes of the velocity vectors of the extracted elements, calculating the third velocity component by calculating inner products of the velocity vectors of the extracted elements and vectors toward the extracted elements from the central point, and calculating the fourth velocity component by calculating outer products of the velocity vectors of the extracted elements and the vectors toward the extracted elements from the central point.

The determining may involve analyzing the updated representative value of the selected class and representative values of remaining classes.

The signal may include an output signal of an event-based sensor configured to detect the event.

In another general aspect, there is provided a method of user interface involving receiving events corresponding to a plurality of objects, classifying each of the events as corresponding to a class among a plurality of classes that correspond to the plurality of objects, updating class information relating to one or more of the classes based on the classified events, and determining a user input based on the updated class information.

The classifying may involve detecting, for each of the events, a class having a representative value most similar to a value of the corresponding event, among the plurality of classes.

The class information may include at least one of pixels included in the classes, events included in the classes, and representative values of the classes stored in a memory.

The determining may involve calculating optical flows for the classes, calculating velocity components of the classes based on the calculated optical flows, and recognizing a command to process the user input based on the velocity components of the classes.

In another general aspect, a non-transitory computer-readable storage medium includes a program comprising instructions to cause a computer to perform a method described above.

In yet another general aspect, an apparatus for user interface includes a classifier configured to classify an event as corresponding to an object among a plurality of objects, an updater configured to update representative values corresponding to at least one of the plurality of objects based on the classified event, and a processor configured to determine a user input corresponding to the event based on the updated representative values.

The event may include at least one of a brightness-changing event, a sound-changing to event or a touch event detected by a sensor.

The representative values may correspond to coordinates or position-related information regarding each of the at least two classes, or to frequency, amplitude or intensity related information regarding each of the at least two classes.

The processor may be configured to determine the user input by determining a direction of change regarding one or more of the plurality of objects based on the updated representative values.

The processor may be configured to determine the user input based on the updated representative values by determining either a relative movement of one object to another object among the plurality of objects or a change in frequency, amplitude, or intensity of sound produced by one or more of the plurality of objects.

Other features and aspects will be apparent from the following detailed description, the drawings, and the claims.

Figure 1:
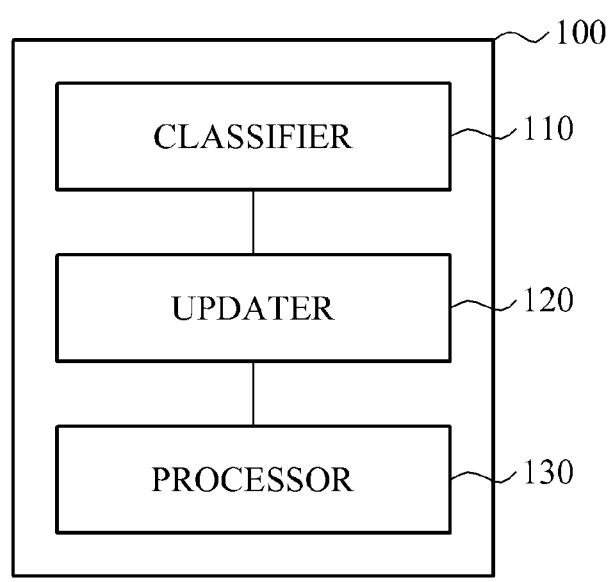
FIG. 1 is a block diagram illustrating an example of an apparatus for user interface.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of an apparatus 100 that provides user interface.

The apparatus 100 may detect or monitor the occurrence of an event. Events may refer to user interface events. The events may correspond to user inputs for interacting with the apparatus, and may include, but are not limited to, a variety of detectable input events such as a brightness-changing event, a sound-changing event, a touch event, and the like. The events may be detected and/or output by various event-based sensors.

For example, an event may be detected and output by an event-based vision sensor that takes a photographic image of an object. The event-based vision sensor may obtain a photographic image of the object and may detect a change in a brightness of incident light in the photographic image over time. The event-based vision sensor may then output an event signal, asynchronous to the time that the brightness-changing event has taken place. For example, in response to the detection of an increase in brightness at a predetermined pixel of a photographic image taken by a camera, the apparatus 100 may determine that a brightness-increasing event has taken place. In response, the event-based vision sensor may output an ON event with respect to the predetermined pixel. Alternatively, in response to the event-based vision sensor detecting a decrease in the brightness in a predetermined pixel, the apparatus 100 may determine that a brightness-decreasing event has taken place, and the event-based vision sensor may output an OFF event corresponding to the predetermined pixel.

The event-based vision sensor may be an asynchronous vision sensor. In contrast to a frame-based vision sensor, the event-based vision sensor outputs pixel data of a portion of an image in which the brightness has changed, rather than scanning an output of a photodiode of each pixel on a frame by frame basis. The change in brightness of light entering the vision sensor may result from the motion of an object. For example, in the event that a light source is substantially fixed in its location with respect to the time frame in which the object is moving, and the object does not independently emit light but rather reflects light, the light that enters the vision sensor corresponds to the light that is emitted from the light source and is reflected by the surface of the object. In the case that the object is stationary with respect to the light source, the light reflected by the stationary object may be substantially unchanged. Thus, the brightness of the light that enters the event-based vision sensor does not changed for the stationary object. However, for an object that is moving during the monitoring of the object, the light reflected by the moving object may change due to the movement of the object. Thus, a change in the brightness of light detected by the vision sensor may convey information regarding the movement of the object.

An event signal that is output by an event-based vision sensor in response to the detection of an object movement may correspond to asynchronously generated information resembling an optic nerve signal that is transferred from a human retina to the brain. For example, the event-based vision sensor may not generate any event signal for a stationary object, and may generate an event signal in response to detecting a moving object, much like the optic nerve signal generated in response to the human retina detecting a moving object.

While an event-based vision sensor that utilizes a change in brightness at a given pixel is described above as an example, the event-based vision sensor is not limited thereto. In another example, a vision sensor may detect a change in color, a change in depth, a change in radiation or the like, rather than a change in brightness, to detect the movement of an object. For example, an event-based vision sensor may detect a color change at a pixel, rather than a brightness change. The detected color may be converted to a numerical value, using as an example a color space chromaticity diagram from International Commission on Illumination, and the numerical value may be used to classify the color changing event as corresponding to a class among a plurality of classes. In yet another example, an infrared camera may be used as an event-based vision sensor to take an image of an object generate infrared radiation, and the change in the amount of infrared radiation detected by the infrared camera may be used to monitor the movement of the object. The infrared radiation may be also used to determine whether the object is a living object that generates body heat.

In another example, in contrast to an event-based vision sensor, an event-based sound sensor may be used to detect a sound change in the environment and may output an event signal. The event-based sound sensor may detect a change in a received sound and may output an event signal asynchronously. For example, in response to the amplitude of a sound increasing within a predetermined frequency band, an event-based sound sensor may detect that a loudness-increasing event is taking place, and may output an ON event with respect to the corresponding frequency band. On the other hand, in the event that the event-based sound sensor detects a decrease in amplitude of a sound in a predetermined frequency band, the event-based sound sensor may determine that a loudness-decreasing event has taken place, and may output an OFF event with respect to the corresponding frequency band.

In yet another example, an event-based touch sensor may detect a touch or a change in touch, and may output an event signal. The event-based touch sensor may detect a change in an applied touch and may output an event signal, asynchronous with respect to time. For example, in the case that a touch input event is detected at a predetermined position of a touch screen, touch pad or the like, the event-based touch sensor may output an ON event with respect to the corresponding position at which the touch input occurred. In response to a touch release event being detected at a predetermined position, the event-based touch sensor may output an OFF event with respect to the corresponding position.

Referring to FIG. 1, according to one example, a user interface apparatus 100 includes a classifier 110, an updater 120, and a processor 130.

The classifier 110 classifies a detected event as an event that belongs to one class among a plurality of event classes. The available event classes for classification may be predetermined; that is, the plurality of event classes may be determined or set in advance of detecting the event. In one example, the classifier 110 may determine a class that is most similar to the detected event, and may classify the detected event as an event that belongs to the determined class.

The plurality of classes used for classification by the classifier 110 may include identical types of classes. For example, the plurality of classes may include a first class that corresponds to a left hand of a user, and a second class that corresponds to a right hand of the user. In response to receiving a new event, the classifier 110 may determine whether the received event corresponds to the first class or the second class.

The event may be expressed using an event value. For example, in response to detecting a brightness-changing event, the corresponding event may be expressed with an event value that indicates a pixel in which the brightness has changed. Similarly, in response to detecting a sound-changing event, the corresponding event may be expressed with an event value that indicates a frequency band in which the sound has changed. Further, in response to detecting a touch event, the corresponding event may be expressed with an event value that indicates a position at which the touch input has occurred.

According to one example, each of the plurality of classes include a representative value representing the corresponding class. Each class includes a plurality of events that are classified in advance. A representative value representing each class is calculated based on event values of events classified as the corresponding class. For example, the brightness changes in pixels corresponding to the left hand of the user may be determined as the first class, and the brightness changes in pixels corresponding to the right hand of the user may be determined as the second class. In response to receiving a brightness-changing event, a representative value of each of the first class and the second class may be calculated based on an event value that indicates a pixel in which the brightness has changed.

In this example, the classifier 110 compares the event value to representative values of the classes, and calculates a similarity between the received event and each class. The classifier 110 determines, based on similarities, whether the received event corresponds to the first class or the second class. For example, the classifier 110 may select a class having a higher similarity between the first class and the second class, and may classify the received event as the selected class.

Depending on the event that is detected, the plurality of classes may include different types of classes. For example, the plurality of classes may further include a third class with respect to a sound-changing event, in addition to the first class and the second class. In this example, the classifier 110 may classify the corresponding event using a type of the received event. In response to receiving a sound-changing event, the classifier 110 may determine that the received event is most similar to the third class, and may classify the corresponding event as the third class.

In response to the classifier 110 classifying an event based on an event class, the updater 120 may update the class information regarding the classified event. The information regarding the class of the event, hereinafter referred to as the class information, may include, but is not limited to, a pixel identifying information, an event, or a representative value of the event class. The updater 120 may update the class information using various schemes. For example, the updater 120 may add an event newly classified as the corresponding class to an event previously classified as the corresponding class, and may newly calculate a representative value representing the corresponding class based on all events. In another example, the updater 120 may update a representative value of the class based on a previous representative value of the class and an event value of a newly classified event. For example, the updater 120 may update the class of a detected event, using the following Equation 1:

$$\rho_i \leftarrow \begin{cases} \alpha \cdot e + (1-\alpha) \cdot \rho_i, & \text{closest} \\ \rho_i, & \text{otherwise} \end{cases} \quad \text{[Equation 1]}$$

In Equation 1, $\rho_i$ denotes a representative value of an $i^{th}$ class, e denotes an event value corresponding to an event, and $\alpha$ denotes a weight of the event. In response to the $i^{th}$ class being most similar to the event, the updater 120 may update the representative value of the $i^{th}$ class using the first expression in Equation 1. In response to the $i^{th}$ class not being most similar to the event, the updater 120 may maintain previous representative values of the class using the second expression in Equation 1.

In this example, the processor 130 processes a user input corresponding to the event based on the updated class information. For example, the processor 130 may track objects corresponding to the plurality of classes or obtain a relative position of the objects, based on the updated class information. The tracked objects or the objects of which the relative position is obtained may include both hands of a single user, or a plurality of input devices used by a plurality of users. The processor 130 processes the user input by analyzing the tracked objects based on a context. In response to a decrease in the distance between the relative positions of the objects, the processor 130 may zoom out or may reduce a viewing area on a screen. Conversely, in response to an increase in the distance between the relative positions of the objects, the processor may zoom in or may enlarge a viewing area on the screen. The processor 130 may output a signal including a result of analyzing the user input. The signal output by the processor 130 may include tracking information on the objects corresponding to the plurality of classes, or information on the relative position. The signal output by the processor 130 may be transferred to an external device through a variety of wired and wireless communication or cloud environments.

The user interface apparatus 100 may provide technology that classifies event information into at least two classes in real time. Such real-time information classification technology may be utilized for data processing technology, human-computer interaction (HCI) technology, and image processing technology. In addition, the user interface apparatus 100 may provide technology that classifies an event through a couple of four arithmetic operations and comparison operations per event, thereby enabling fast, low-power consuming, and easy configuration of a digital or analog logic. The user interface apparatus 100 may be combined with fast transmission event-based communication technology.

Figure 2:
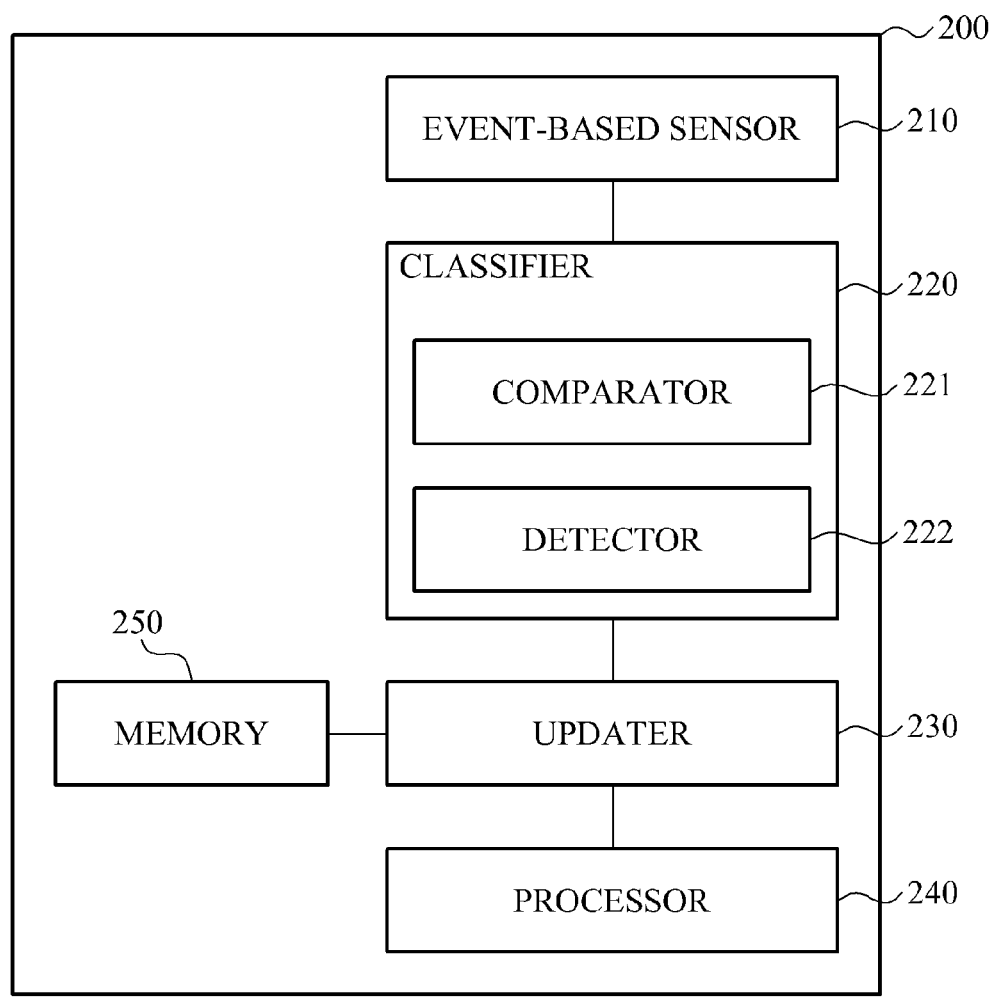
FIG. 2 is a block diagram illustrating another example of an apparatus for user interface.

FIG. 2 illustrates another example of a user interface apparatus 200.

Referring to FIG. 2, the user interface apparatus 200 includes a classifier 220, an updater 230, a processor 240 and a memory 250. The descriptions provided with reference to FIG. 1 also applies to the classifier 220, the updater 230, and the processor 240. The user interface apparatus 200 further includes an event-based sensor 210. The event-based sensor 210 refers to a sensor that uses an operation principle of a human nervous system to sense an event, and may include an event-based vision sensor, an event-based sound sensor, an event-based touch sensor and the like. For instance, the human body uses various sensory receptors such as mechanoreceptors for detecting pressure, touch and sound, photoreceptors for detecting visible light, and thermoreceptors for detecting temperature, and converts the stimulus into electrical signals that are integrated in the central nervous system to allow a person to perceive changes in his or her environment.

In one example of the user interface apparatus 200, the event-based vision sensor detects a change in a brightness of incident light and outputs an event signal in an asynchronous manner with respect to time. In another example, the event-based sound sensor detects a change in a received sound and outputs an event signal in an asynchronous manner with respect to time. In another example, the event-based touch sensor detects a change in an applied touch and outputs an event signal in an asynchronous manner. In yet another example, various event-based sensors are used to detect an event and to output an event signal.

The classifier 220 includes a comparator 221 and a detector 222. The comparator 221 compares an event to information on a plurality of classes. For example, the comparator 221 may compare an event value included in an event signal to representative values of the plurality of classes. The detector 222 detects a class most similar to the event based on a result of the comparison performed by the comparator 221. For example, the detector 222 may detect a class having a representative value most similar to the event value.

In response to the classifier 220 receiving a brightness-changing event, an event value included in the event signal may include a pixel index of the event that is detected, and a timestamp of the detected event. The pixel index refers to information identifying a predetermined pixel, and may include position information of the predetermined pixel or coordinate information of the predetermined pixel. Each of the plurality of classes may include center coordinates as a representative value. The comparator 221 may compare the pixel index to center coordinates of the plurality of classes, and the detector 222 may detect a class having center coordinates most similar to the pixel index.

A similarity between the pixel index and a representative value may be determined using various schemes. For example, the similarity may be determined based on a distance between the pixel index and the representative value. In the case that the distance between the pixel index and the representative value is relatively short, a relatively high similarity may be determined Conversely, in the case that the distance between the pixel index and the representative value is relatively long, a relatively low similarity may be determined. The distance between the pixel index and the representative value may be calculated using an $L^2$ norm, also referred to as Euclidean norm, and the similarity between the pixel index and the representative value may be calculated based on an inverse number of the $N^2$ norm. The detector 222 may detect a class having a representative value most similar to the pixel index based on the inverse number of the $L^2$ norm.

The updater 230 may update a representative value of the class that corresponds to an event based on the detected class. The representative value of the class may be stored in the memory 250.

Figure 3:
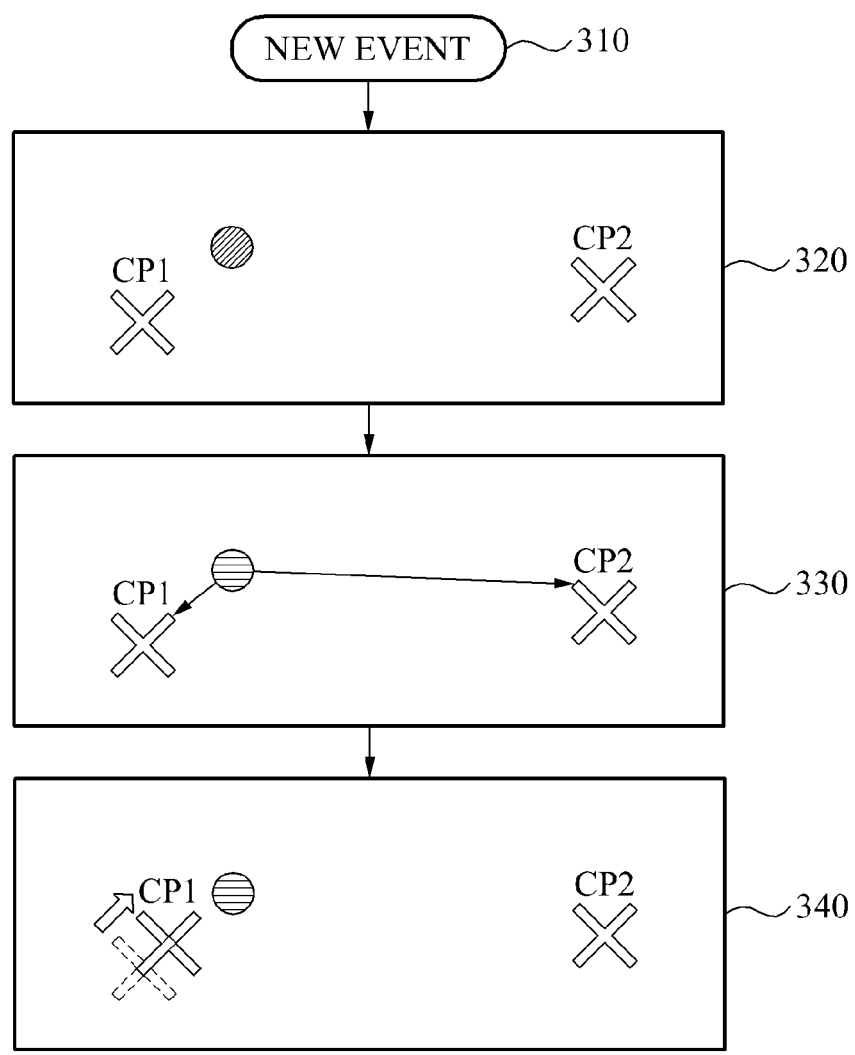
FIG. 3 is a diagram illustrating an example of a method of classifying an event and updating class information.

FIG. 3 illustrates an example of a method of classifying an event and updating class information.

Referring to FIG. 3, a user interface apparatus receives a new event, in 310. In this example, the user interface apparatus uses representative values representing a plurality of predetermined classes to classify the received event. For example, the user interface apparatus may use a first representative value CP1 to represent a first class, and a second representative value CP2 to represent a second class. The first representative value CP1 and the second representative value CP2 may correspond to center coordinates of the first class and center coordinates of the second class, respectively, as described above.

In 320, the user interface apparatus obtains an event value E that corresponds to the received event. In 330, the user interface apparatus compares the event value E to the representative values of the two classes.

The user interface apparatus detects a class having a representative value most similar to the event value E, among the representative values of the two classes, and classifies the event as the detected class. In the illustrated example, because the event value E of the received event is more similar to the first representative value CP1 than the second representative value CP2, the user interface apparatus classifies the event as an event that belongs to the first class.

In 340, the user interface apparatus updates class information of the classified event. For example, the user interface apparatus may update the representative value of the first class based on the event value E.

In response to receiving another new event, the user interface apparatus determines a class as which the other new event is to be classified, based on the updated representative value of the first class and a representative value of the second class that has not been updated.

Although an example with two classes is illustrated in FIG. 3, the foregoing descriptions may apply to an example in which there are three or more predetermined classes.

Figure 4:
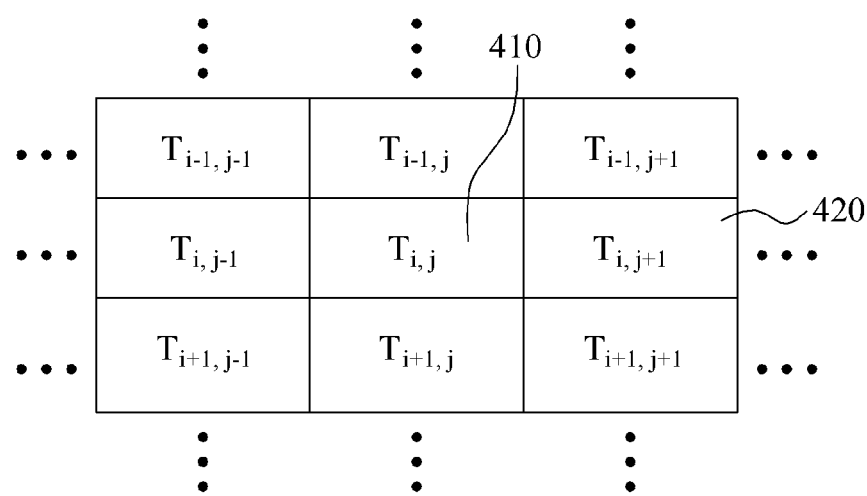
FIG. 4 is a diagram illustrating an example of an event map.

FIG. 4 illustrates an example of an event map 400. The event map 400 may be stored in a memory.

Referring to FIG. 4, in response to receiving an event, a user interface apparatus may update the event map 400 based on the received event. The event map 400 includes elements corresponding to a plurality of event values that may be included in an event. Each element may store a timestamp indicating a most recent time at which an event corresponding to the element occurs. In the event map 400, $T_{i,j}$ denotes a most recent time at which an event occurred in an element 410 at a position of (i, j), and $T_{i,j+1}$ denotes a most recent time at which an event occurred in an element 420 at a position of (i, j+1). In addition, each element may store a class of a classified event corresponding to the element.

In response to receiving an event, the user interface apparatus updates an element corresponding to an event value included in the received event. In one example, the user interface apparatus may update an element corresponding to the event, rather than updating all elements. For example, the user interface apparatus may detect an element corresponding to an event value of the received event, among the plurality of elements included in the event map 400, and may update a timestamp of the detected element with a timestamp of the received event. In addition, the user interface apparatus may update a class of the detected element with a class of the classified received event.

The user interface apparatus may store, for each element, a time at which a new event occurs in units less than or equal to one microsecond (μs). The user interface apparatus may perform image processing based on information about a last event occurring in each element, irrespective of a history of events having occurred with time. The user interface apparatus may provide technology that performs image processing with a relatively smaller memory and relatively low complexity of operations.

Figure 5:
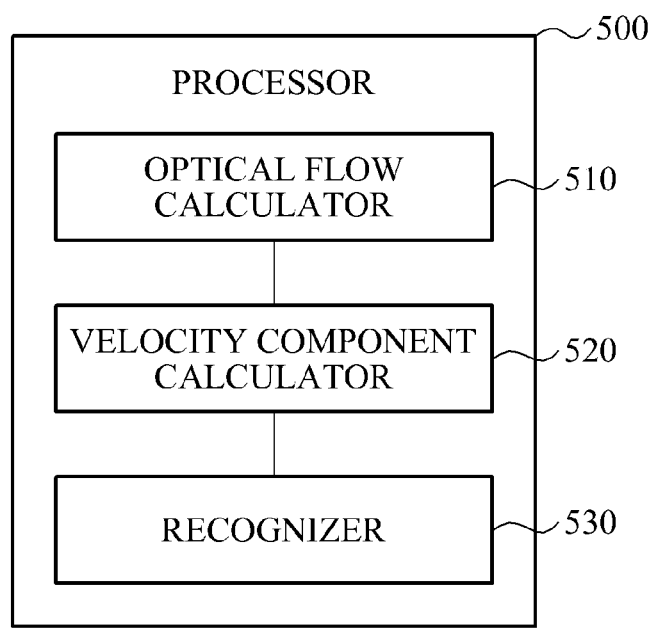
FIG. 5 is a block diagram illustrating an example of a processor.

FIG. 5 illustrates an example of a processor 500. Hereinafter, for ease of description, a case in which the processor 500 processes a brightness-changing event will be described. However, the operation of the processor 500 is not limited thereto.

Referring to FIG. 5, the processor 500 includes an optical flow calculator 510, a velocity component calculator 520, and a recognizer 530. The optical flow calculator 510 may calculate optical flows that correspond to a class. The optical flows refer to a set of velocity vectors including information about a brightness change. For example, the optical flows may include a set of velocity vectors corresponding to a plurality of events classified as a predetermined class. In response to an object being repositioned with respect to a camera, a brightness of each pixel may be changed. The optical flows may include such a change of brightness in a form of a two-dimensional vector.

In an example in which an event-based vision sensor is used to detect the change in brightness, a plurality of elements included in the event map 400 of FIG. 4 may correspond to a plurality of pixels included in the event-based vision sensor. Each of a plurality of classes may include elements corresponding to an event classified as the corresponding class. The elements included in each class may correspond to at least a portion of the plurality of pixels, and an optical flow of each class may correspond to a set of two-dimensional vectors having predetermined directions and magnitudes on a two-dimensional plane including the plurality of pixels.

The optical flow calculator 510 may include a plurality of partial optical flow calculators corresponding to the plurality of classes. Each partial optical flow calculator may calculate an optical flow of a corresponding class. In another example, the optical flow calculator 510 may include an overall optical flow calculator configured to calculate optical flows of all classes altogether, without class distinction.

While an example of processing a visual input is provided as an example, the above described processing method may be applied to a sound input or a touch input in another example. For instance, rather than calculating an optical flow in the optical flow calculator 510, a sound change or a touch change may be calculated by a touch flow calculator or a sound change calculator.

Hereinafter, an example of a method of operation of a partial optical flow calculator or the overall optical flow calculator will be described in detail with reference to FIG. 6. The optical flow calculator may refer to the partial optical flow calculator or the overall optical flow calculator.

Figure 6:
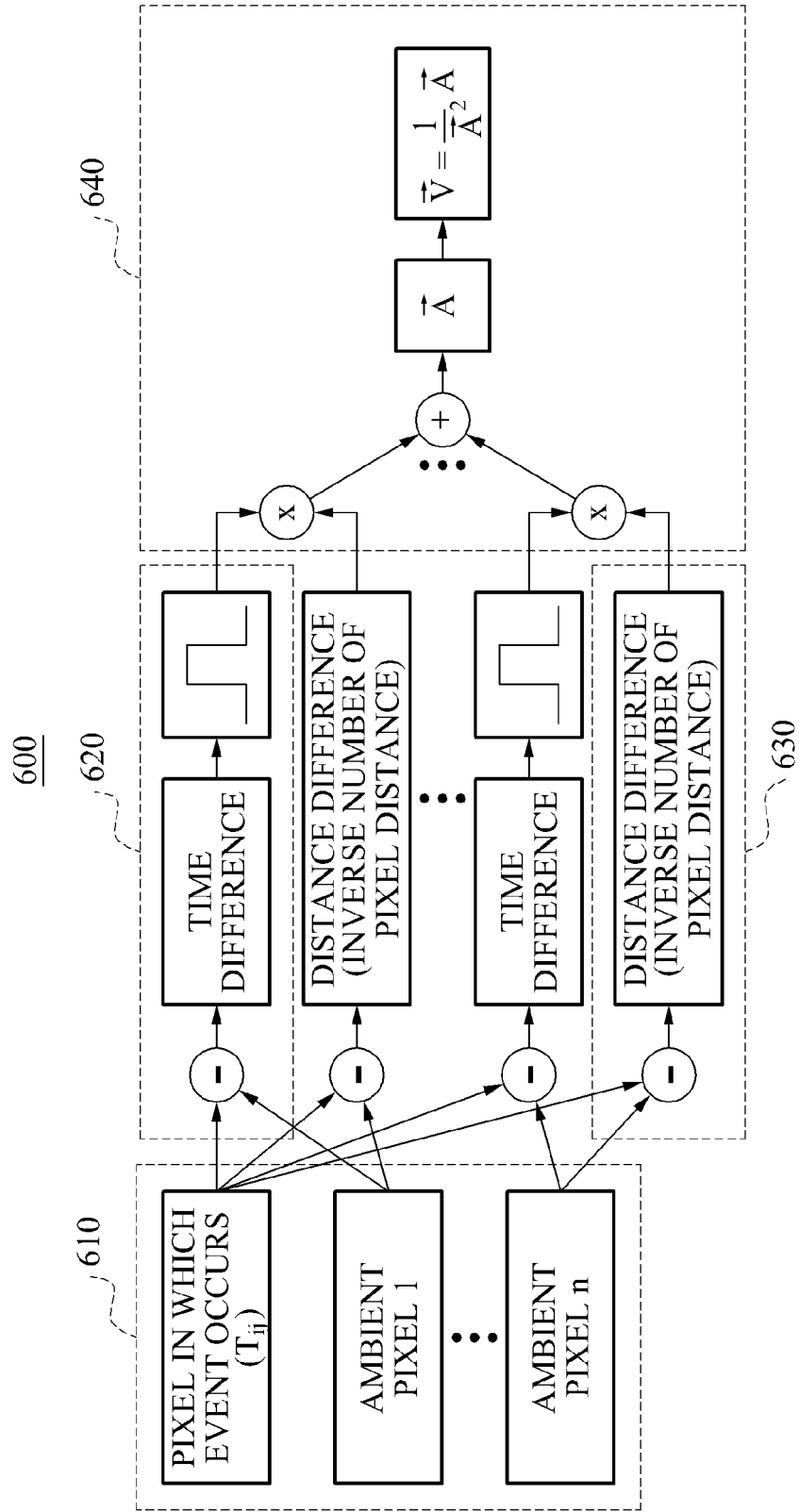
FIG. 6 is a diagram illustrating an example of an optical flow calculator.

Referring to FIG. 6, an operation calculator 600 includes an ambient pixel obtainer 610, a time difference calculator 620, a distance difference calculator 630, and an optical flow calculation performer 640. Each module illustrated in FIG. 6 may be implemented with software, hardware, or a combination thereof. For example, each of the ambient pixel obtainer 610, the time difference calculator 620, the distance difference calculator 630, and the optical flow calculation performer 640 may be implemented with a processor, a memory, a hardware accelerator (HWA), a field programmable gate array (FPGA), or any combination thereof.

The ambient pixel obtainer 610 obtains a plurality of ambient pixels based on a pixel in which an event occurs. For example, the ambient pixel obtainer 610 may obtain eight ambient pixels directly adjacent to the pixel in which the event occurs. In another example, the ambient pixel obtainer 610 may obtain eight ambient pixels directly adjacent to the pixel in which the event occurs, and sixteen ambient pixels surrounding the eight ambient pixels.

The time difference calculator 620 calculates information about a time difference between the pixel in which the event occurs and the ambient pixels, based on timestamp information stored in the event map 400 of FIG. 4. For example, in response to a new event occurring in the pixel 410, the time difference calculator 620 may calculate a difference between the time $T_{i,j}$ stored in the pixel 410 and the time $T_{i,j+1}$ stored in the ambient pixel 420. In this example, a value of the time $T_{i,j}$ stored in the pixel 410 may have been updated in response to the occurrence of the new event. Thus, $T_{i,j}-T_{i,j+1}$ may correspond to a value greater than or equal to "0". In an example in which an event occurs at the same time in the pixel 420, $T_{i,j}-T_{i,j+1}$ may correspond to a value of "0". The time difference calculator 620 may calculate the aforementioned time difference for each of the plurality of ambient pixels obtained by the ambient pixel obtainer 610. Further, in an example in which the calculated time difference is out of a predetermined window range, for example, 0.1 seconds (s), the time difference calculator 620 may treat the time difference as insignificant information, and may output "0" in lieu of the calculated time difference.

The distance difference calculator 630 calculates information about a distance difference between at least one pixel in which an event occurs and ambient pixels thereof. The distance difference calculator 630 may calculate an inverse number of a pixel distance between the pixel in which the new event occurs and the ambient pixels thereof. The pixel distance may include a normalized distance among a plurality of image pixels. For example, a pixel distance between the pixel 410 and the pixel 420 of FIG. 4 may correspond to "1". The distance difference calculator 630 may calculate the inverse number of the pixel distance for each of the plurality of ambient pixels obtained by the ambient pixel obtainer 610.

The optical flow calculation performer 640 calculates an optical flow based on information about the time difference calculated by the time difference calculator 620 and information about the distance difference calculated by the distance difference calculator 630. In this example, the optical flow calculation performer 640 calculates a two-dimensional vector A corresponding to the pixel in which the event occurred using the information about the time difference and the information about the distance difference, and performs an operation of dividing the two-dimensional vector A by a value of an inner product of the two-dimensional vector A.

The optical flow calculation performer 640 multiplies a value of the information about the time difference corresponding to each ambient pixel of the pixel in which the event occurred by an inverse number of the distance difference. The optical flow calculation performer 640 calculates the two-dimensional vector A using a sum of resulting values of multiplications corresponding to the ambient pixels. The optical flow calculation performer 640 calculates the two-dimensional vector A, using the following Equation 2:

$$\vec{A} = \vec{d} \cdot \Delta t \frac{1}{\|\vec{d}\|^2} \qquad \text{[Equation 2]}$$

In Equation 2, Δt denotes information about a time difference, and a two-dimensional vector d denotes information about a distance difference. A unit of the two-dimensional vector A corresponds to "time/distance". The optical flow calculation performer 640 calculates a velocity vector V included in an optical flow by dividing the two-dimensional vector A by the value of the inner product of the two-dimensional vector A. A unit of the velocity vector V corresponds to "distance/time". The optical flow calculation performer 640 calculates the velocity vector V for each pixel in which an event occurs, thereby generating an optical flow including the velocity vector of each pixel.

In one example, the optical flow calculator 600 eliminates an element that may act as noise with respect to the velocity vector of each pixel included in the optical flow. As described above, the time difference calculator 620 outputs "0" in response to a time difference between a pixel in which an event occurs and an ambient pixel thereof being outside of a predetermined window range. When differences between the pixel in which the event occurs and all ambient pixels thereof are out of the predetermined window range, the two-dimensional vector A calculated by the optical flow calculation performer 640 corresponds to "0". In this example, the optical flow calculation performer 640 outputs "0", in lieu of an infinite value corresponding to a value of the calculated velocity vector V.

Referring back to FIG. 5, the velocity component calculator 520 may calculate, based on the optical flow, velocity components of a class of which class information is updated. Hereinafter, an example of an operation of the velocity component calculator 520 will be described in detail with reference to FIG. 7.

Figure 7:
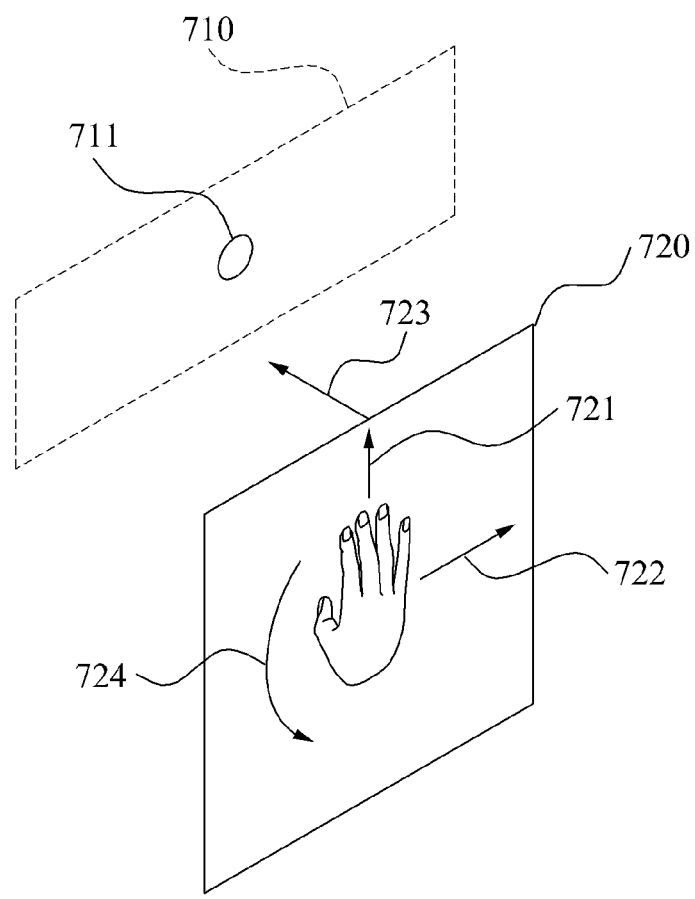
FIG. 7 is a diagram illustrating an example of an input method using velocity components.

Referring to FIG. 7, velocity components includes a first velocity component Vx at which an object moves in an x-axial direction 722 on a plane 720 parallel to a sensor plane 810 on which a sensor 711 is disposed, a second velocity component Vy at which the object moves in a y-axial direction 721 on the plane 720, a third velocity component Vz at which the object moves in a direction 723 orthogonal to the plane 720, and a fourth velocity component to at which the object rotates in a counterclockwise direction 724 on the plane 720.

Although not shown in the drawing, the velocity component calculator 520 may include a plane velocity calculator, an optical flow center calculator, a z-axial velocity calculator, and an angular velocity calculator. The plane velocity calculator may calculate the first velocity component Vx and the second velocity component Vy based on an optical flow. The plane velocity calculator may calculate an average of the optical flow in order to calculate the first velocity component Vx and the second velocity component Vy.

As described above, the optical flow may include a velocity vector of a pixel in which an event occurs. The plane velocity calculator may calculate a sum of all velocity vectors of pixels, thereby calculating the average of the optical flow. Since each velocity vector of a pixel may correspond to a two-dimensional vector, the average of the optical flow may correspond to a two-dimensional vector. The plane vector calculator may separate an x-axial component and a y-axial component in the calculated average of the optical flow, thereby calculating the first velocity component Vx and the second velocity component Vy.

The optical flow center calculator may calculate a center of the optical flow based on the optical flow. The optical flow center calculator may perform a center of gravity operation based on a position of a pixel in which an error occurs and a magnitude of a velocity vector of the corresponding pixel included in the optical flow, and may calculate the center of the optical flow.

Figure 8:
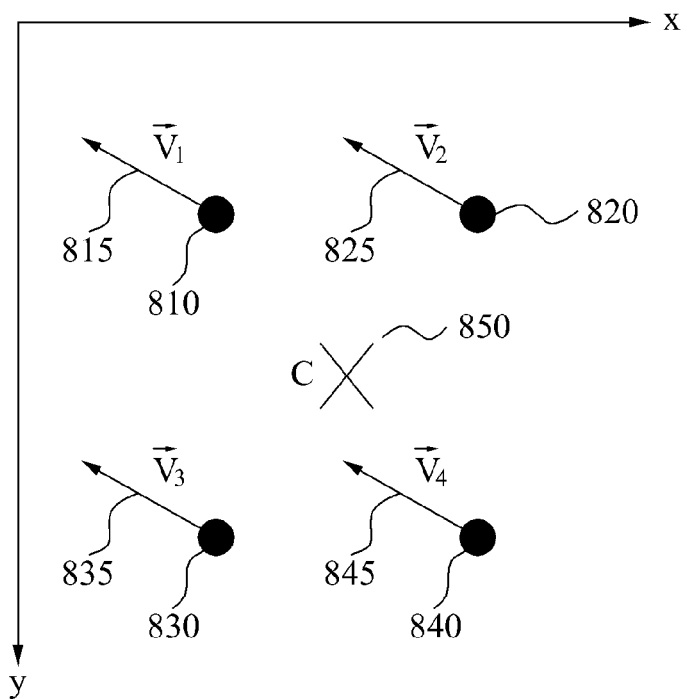
FIG. 8 is a diagram illustrating an example of a method of calculating an optical flow center.

For example, referring to FIG. 8, an event occurs in a pixel 810, a pixel 820, a pixel 830, and a pixel 840. In this example, an optical flow generated by an optical flow generator includes a velocity vector $V_1$ 815 of the pixel 810, a velocity vector $V_2$ 825 of the pixel 820, a velocity vector $V_3$ 835 of the pixel 830, and a velocity vector $V_4$ 845 of the pixel 840. The optical flow center calculator calculates a center C 850 of the optical flow by applying, to Equation 3 below, a position, for example, an x-axial pixel coordinate and a y-axial pixel coordinate, of each of the pixel 810, the pixel 820, the pixel 830, and the pixel 840, and a magnitude, for example, a magnitude in an x-axial direction and a magnitude in a y-axial direction, of each of the velocity vector $V_1$ 815, the velocity vector $V_2$ 825, the velocity vector $V_3$ 835, and the velocity vector $V_4$ 845.

$$c = \left( \frac{\sum_i |V_{xi}| x_i}{\sum_i |V_{xi}|}, \frac{\sum_i |V_{yi}| y_i}{\sum_i |V_{yi}|} \right) \qquad \text{[Equation 3]}$$

In this example, the z-axial velocity calculator calculates the third velocity vector Vz based on the optical flow and the center of the optical flow. The z-axial velocity calculator generates a relative position vector corresponding to the pixel based on a position of the pixel in which the event occurs and the center of the optical flow. Further, the z-axial velocity calculator calculates the third velocity vector Vz by performing an inner product operation using the relative position vector and a velocity vector of the corresponding pixel included in the optical flow.

Figure 9:
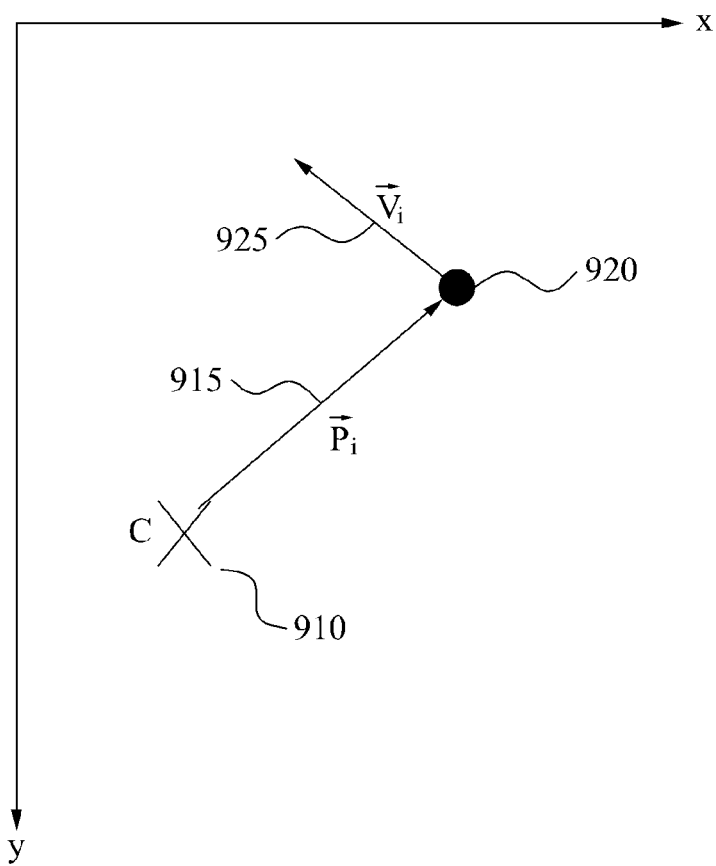
FIG. 9 is a diagram illustrating an example of a method of calculating a z-axial velocity and an angular velocity.

For example, referring to FIG. 9, C 910 denotes a center of an optical flow calculated by the optical flow center calculator, and a pixel 920 corresponds to an $i^{th}$ pixel among pixels in which an event occurs. The z-axial velocity calculator generates a relative position vector 915 based on a position of the center C 910 and a position of the pixel 920. Further, the z-axial velocity calculator calculates the third velocity component Vz by applying the relative position vector 915 and a velocity vector 925 of the pixel 920 to the following Equation 4:

$$V_z = \sum_i \vec{p}_i \cdot \vec{V}_i \qquad \text{[Equation 4]}$$

Referring to FIG. 7, in response to the object moving in the z-axis direction 723 to be close to the sensor 711, the third velocity component Vz calculated by the z-axial velocity calculator may have a positive (+) value. Conversely, in response to the object moving in an opposite direction away from the sensor 711, the third velocity component Vz may have a negative (−) value.

The angular velocity calculator calculates the fourth velocity component to based on the optical flow and the center of the optical flow. In this example, the angular velocity calculator generates a relative position vector corresponding to the pixel based on a position of the pixel in which the event occurs and the center of the optical flow. Further, the angular velocity calculator calculates the fourth velocity vector to by performing an outer product operation by using the relative position vector and a velocity vector of the corresponding pixel included in the optical flow.

For example, referring to FIG. 9, C 910 denotes a center of an optical flow calculated by the optical flow center calculator, and a pixel 920 corresponds to an $i^{th}$ pixel among pixels in which an event occurs. The angular velocity calculator may generate a relative position vector 915 based on a position of the center C 910 and a position of the pixel 920. Further, the angular velocity calculator may calculate the fourth velocity component to by applying the relative position vector 915 and a velocity vector 925 of the pixel 920 to the following Equation 5:

$$\omega = \sum_i \vec{p}_i \cdot \vec{V}_i \qquad \text{[Equation 5]}$$

Referring to FIG. 7, in response to detecting that the object rotated in the counterclockwise direction 724, the fourth velocity component to calculated by the angular velocity calculator may have a positive (+) value. Conversely, in response to detecting that the object rotated in a clockwise direction, the fourth velocity component to may have a negative (−) value.

Referring back to FIG. 5, the recognizer 530 may recognize a user input by analyzing the plurality of velocity components. The recognizer 530 may analyze the plurality of velocity vectors using various schemes.

In an example, the recognizer 530 recognizes the user input based on velocity information of the plurality of classes. A user may perform a motion, hereinafter referred to as "motion A", of rotating two hands in a counterclockwise direction while maintaining a posture of holding a steering wheel with the two hands. In response, the recognizer 530 combines information on a velocity of a first class corresponding to the left hand and information on a velocity of a second class corresponding to the right hand in order to recognize the motion A.

In another example, the recognizer 530 analyzes the plurality of velocity components based on a user input context. The user input context may include a type of application currently being executed, stored history information, sensor information, peripheral device information and the like. The recognizer 530 processes the user input differently with respect to identical velocity components based on the user input context, thereby providing user-customized interfacing technology. For example, the recognizer 530 may recognize an identical motion of a user as different commands based on an application being executed. While a car racing game application is being executed, the recognizer 530 may recognize the motion A as a command to rotate a steering wheel of a user vehicle in a counterclockwise direction. While an image editing application is being executed, the recognizer 530 may recognize the motion A as a command to rotate an image being edited in a counterclockwise direction. While a multimedia playback application is being executed, the recognizer 530 may recognize the motion A as a command to rewind multimedia content being played.

In another example, the recognizer 530 analyzes a relative velocity among the plurality of classes based on the plurality of velocity components, and recognizes the user input based on a result of the analysis. For example, a user may perform a motion, hereinafter referred to as "motion B", of clapping with two hands. The recognizer 530 may recognize the motion B in response to detecting that an input sequence in which a distance between a representative value of a first class corresponding to the left hand and a representative value of a second class corresponding to the right hand is decreasing and increasing. For ease of description, inputs that belong to two classes are used as an example. However, the recognizer 530 is not limited thereto. The recognizer 530 may recognize the user input by analyzing a relative velocity among three or more classes. The recognizer 530 may also recognize the user input based on a correlation of the relative velocity. In this example, the recognizer 530 recognizes the user input by analyzing relative velocities among at least three classes.

In yet another example, the recognizer 530 recognizes the user input based on a relative velocity among classes irrespective of an orientation of the events. For example, when a user claps while sitting upright and when the user claps while lying on a side, different event signals may be detected by an event-based sensor due to the orientation of the user. In the example in which the user is sitting upright while the user claps his or her hands, the two hands moves in a horizontal direction. In the example in which the user is lying on his or her side as the user claps his or her hands, the two hands may move in a vertical direction. Irrespective of the directions in which a representative value of a first class corresponding to the left hand and a representative value of a second class corresponding to the right hand are moving on an absolute coordinate, the recognizer 530 may recognize the user input based on a relative velocity between the two representative values. In this example, the recognizer 530 recognizes that the two hands are making a clapping motion, irrespective of a posture of the user.

In another example, the recognizer 530 analyzes a relative velocity based on a user input context. For example, the recognizer 530 may recognize the user input based on the user input context and the relative velocity. The descriptions provided above may apply to a scheme of using the user input context and a scheme of using the relative velocity and thus, duplicated descriptions will be omitted for conciseness.

In this example, the processor 500 processes the user input based on a relative position among the plurality of classes, rather than the velocity information of the plurality of classes. The processor 500 analyzes the relative position among the plurality of classes based on the representative values of the plurality of classes. Then, the processor 500 recognizes the user input based on the relative position. For example, a user may perform a motion, hereinafter referred to as "motion C", of covering both ears with two hands. The processor 500 recognizes the motion C by analyzing center coordinates of a first class corresponding to the left hand, center coordinates of a second class corresponding to the right hand, and center coordinates of a third class corresponding to the head.

The processor 500 processes the user input based on a user input context. For example, while a music playback application is being executed, the processor 500 recognizes the motion C and activates a mute function.

Figure 10:
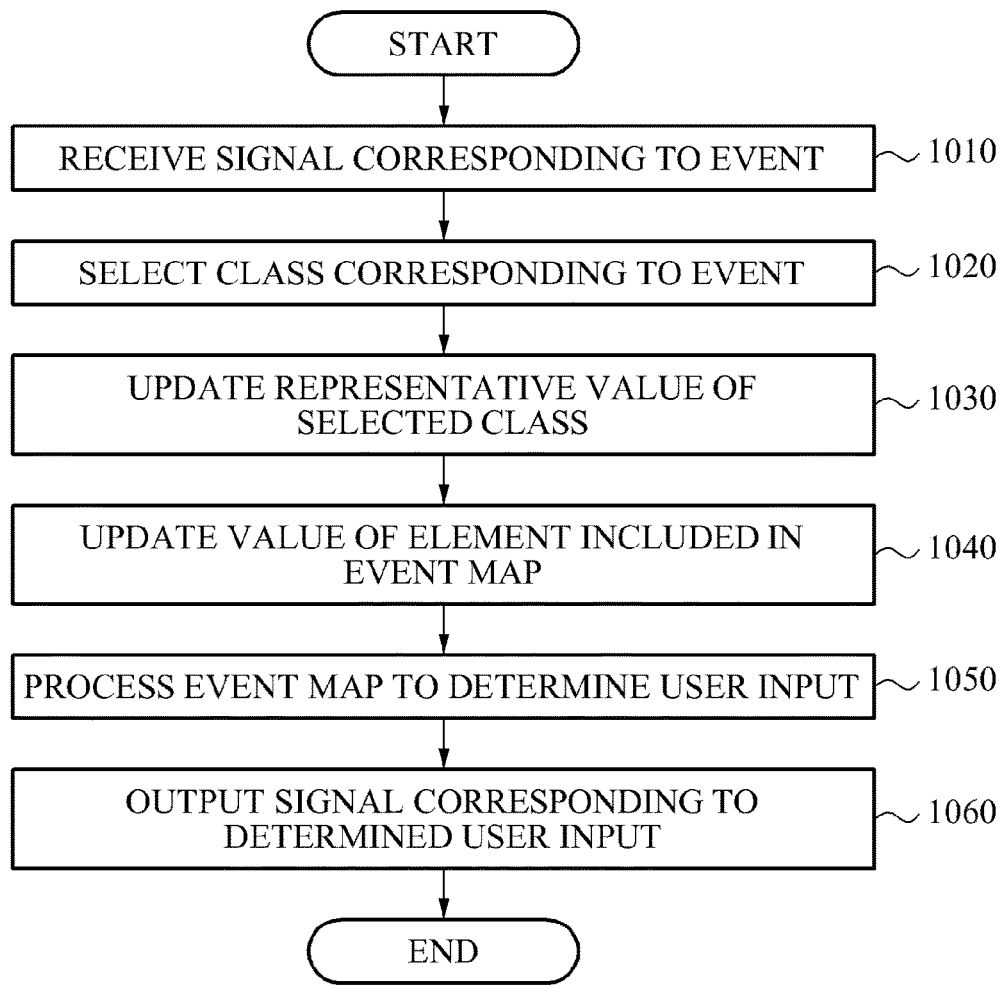
FIG. 10 is a flowchart illustrating an example of a method of user interface.

FIG. 10 illustrates an example of a method of providing a user interface.

Referring to FIG. 10, a user interface apparatus receives a signal, in 1010. The signal includes a timestamp of an event and an index identifying the event. For example, the user interface apparatus may receive an output of an event-based image sensor. The output of the event-based image sensor may include an index identifying a detected event. An event may be identified through coordinates of the location of the event.

In one example, an index identifying the event corresponds to coordinates of the event. Referring to an example illustrated in FIG. 11A, a sensing area of the event-based image sensor is expressed by a plurality of elements arranged in a form of a two-dimensional matrix. Each of the plurality of elements in the two-dimensional matrix corresponds to a unique index. In response to the event-based image sensor detecting a new event at a position of an element 1130, the output of the event-based image sensor includes an index that indicates coordinates of the element 1130.

In addition, the output of the event-based image sensor includes a timestamp indicating information regarding a time at which an event is detected by the image sensor. For example, the timestamp may indicate the information regarding a time at which an event is detected, in μs units.

In 1020, the user interface apparatus selects one of a plurality of predetermined classes based on the index. The user interface apparatus may compare the index to representative values of the plurality of classes to select a single class. As described above, the index may indicate coordinates of a corresponding event. Thus, the class selection is based on the coordinates of a corresponding event. In this example, a representative value of each of the plurality of classes is regarded as a representative value representing a corresponding class, and indicates, for example, coordinates representing the corresponding class. The representative value of each of the plurality of classes may indicate center coordinates of the corresponding class. The user interface apparatus may compare coordinates of the event indicated by the index to coordinates indicated by the representative values of the plurality of classes, thereby detecting a representative value corresponding to coordinates closest to the coordinates of the event indicated by the index. In this example, the user interface apparatus may select a class having the detected representative value.

Figure 11A:
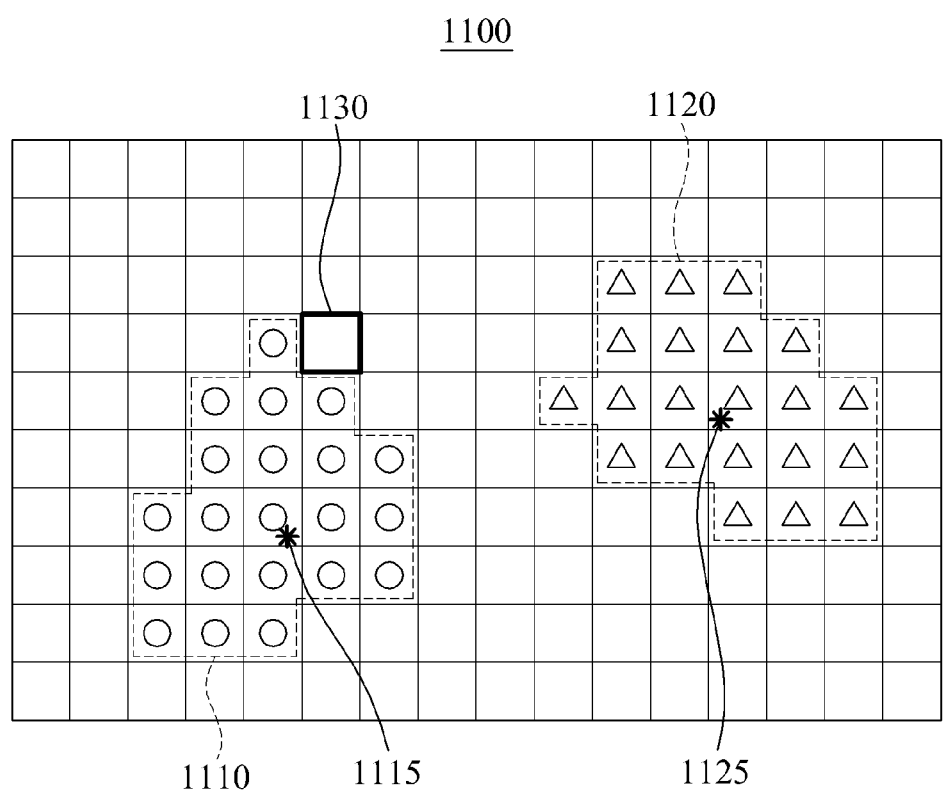
FIGS. 11A and 11B are diagrams illustrating an example of an event map.

Referring to FIG. 11A, an event map 1100 includes a first class 1110 and a second class 1120. Each of the first class 1110 and the second class 1120 includes a plurality of elements. A representative value of the first class 1110 may correspond to center coordinates 1115 corresponding to a center of the plurality of elements included in the first class 1110. A representative value of the second class 1120 may correspond to center coordinates 1125 corresponding to a center of the plurality of elements included in the second class 1120. The user interface apparatus may receive a new event corresponding to the element 1130. The user interface apparatus may compare coordinates of the element 1130 to the center coordinates 1115 of the first class 1110 and the center coordinates 1125 of the second class 1120. As a result of the comparison, the coordinates of the element 1130 are closer to the center coordinates 1115 of the first class 1110 than the center coordinates 1125 of the second class 1120. Thus, the first class 1110 may be selected.

Figure 11B:
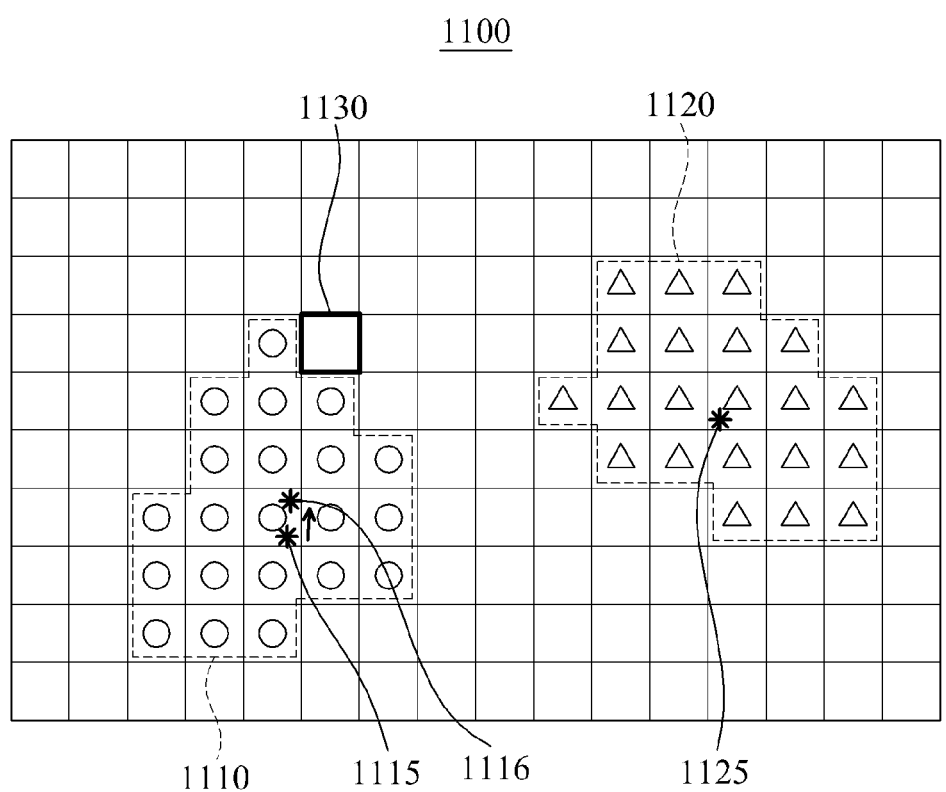

In 1030, the user interface apparatus updates a representative value of the class selected based on the index. The user interface apparatus may classify the event as the selected class. In this example, a representative value of the classified event may be updated in view of a newly included event. Referring to FIG. 11B, the user interface apparatus adds the element 1130 corresponding to the event to the first class 1110. In response to the element 1130 being added to the first class 1110, the center of the first class 1110 may be changed, as illustrated by an arrow in FIG. 11B. In such a case, before the element 1130 is added, the user interface apparatus updates the representative value of the first class 1110 that corresponds to the center coordinates 1115, with center coordinates 1116.

In 1040, the user interface apparatus updates a value of an element corresponding to the index, among a plurality of events included in an event map, based on the timestamp and the selected class. The user interface apparatus may update timestamp information and class information of the element corresponding to the index. Referring to the example illustrated in FIG. 11A, each of the plurality of elements included in the event map 110 stores timestamp information and class information. Timestamp information stored in a single element may include a most recent time at which an event corresponding to the element occurs. In addition, class information stored in a single element may include information indicating a class to which the element belongs. The user interface apparatus updates a value of the element 1130 corresponding to the index of the event. In addition, the user interface apparatus updates the timestamp information of the element 1130 with a time at which the corresponding event occurs, and updates the class information of the element 1130 with information indicating the first class 1110.

Although not shown in the drawings, in another example, the user interface apparatus updates the event map for elements corresponding to recent events to be added to each class. In this example, the user interface apparatus classifies, as valid events, events occurring within a predetermined period of time based on a current time, and resets class information of an element corresponding to an invalid event. The element of which the class information is reset may not belong to any class.

The user interface apparatus may classify, as valid events, events occurring within a predetermined period of time based on timestamp information of a most recent event. For instance, in the case that the event corresponding to the element 1130 is classified as the first class 1110, recent elements among the plurality of elements included in the first class 1110 may be classified as valid events. In this example, the user interface apparatus may classify, as valid events, elements in which events occur within a predetermined period of time based on a time at which the event corresponding to the element 1130 occurs, and may reset class information of remaining elements.

Depending on a case, the user interface apparatus may update the event map for a predetermined number of elements to be added to each of the plurality of classes. In response to a new element being added to a single class, the user interface apparatus may reset class information of events chronologically, from oldest to most recent, for a predetermined number of elements to be added to a corresponding class.

In 1050, the user interface apparatus processes the event map to determine a user input corresponding to the event. The user interface apparatus may determine a user input corresponding to the event based on representative values of the plurality of classes included in the event map. In response to the event map including a class A corresponding to a left hand of a user and a class B corresponding to a right hand of the user, the user interface apparatus may track an aspect in which a representative value of the class A and a representative value of the class B are updated respectively. For example, in response to a decrease in a distance between the representative value of the class A and the representative value of the class B, the user interface apparatus may determine that the input corresponds to both hands of the user moving toward each other. The user interface apparatus may determine the input desired by the user based on the motion, and may output a signal based on the determined user input in 1060. For example, the user interface apparatus may generate an output signal to zoom out or reduce viewing area on a screen. Conversely, in response to an increase in the distance between the representative value of the class A and the representative value of the class B, the user interface apparatus may determine that the input corresponds to a motion of both hands of the user moving away from each other. In this example, the user interface apparatus may generate an output signal to zoom in or enlarge a viewing area on a screen.

The user interface apparatus may provide technology that tracks a plurality of classes quickly and accurately with relatively low operational complexity, using the aforementioned scheme.

The descriptions provided with reference to FIGS. 1 through 9 may apply to each operation illustrated in FIG. 10 and thus, duplicated descriptions will be omitted for conciseness.

Figure 12:
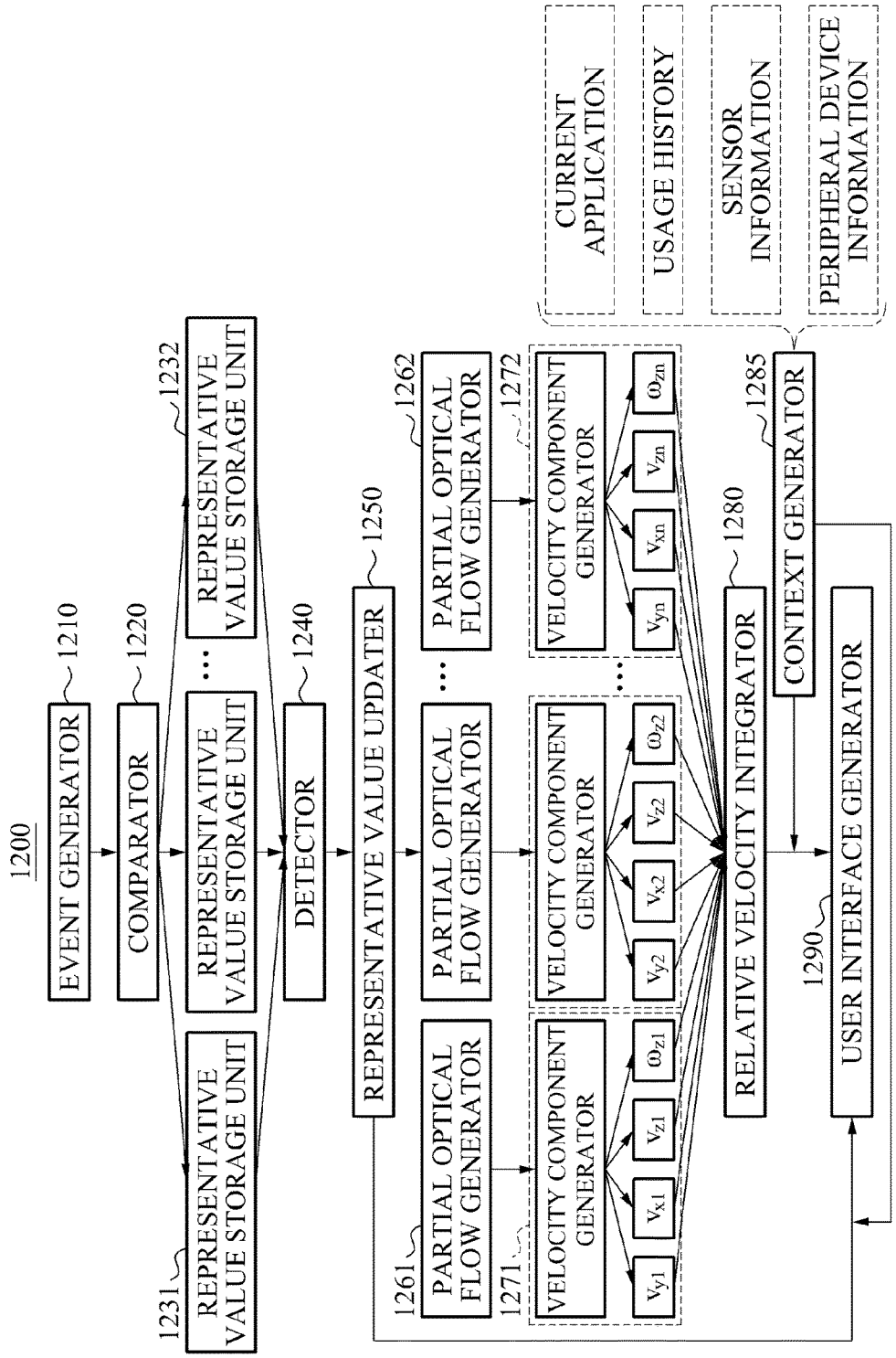
FIG. 12 is a block diagram illustrating another example of an apparatus for user interface.

FIG. 12 illustrates still another example of a user interface apparatus 1200.

Referring to FIG. 12, the user interface apparatus 1200 includes an event generator 1210 configured to generate an event, a comparator 1120 configured to compare a similarity among a plurality of classes, a plurality of representative value storage units 1231 . . . 1232 configured to store representative values of the plurality of classes, a detector 1240 configured to select an identification (ID) of a most similar class, and a representative value updater 1250 configured to update a representative value of the selected class. The comparator 1220 and the detector 1240 may correspond to the comparator 221 and the detector 222 of FIG. 2, respectively, and a combination of the comparator 1220 and the detector 1240 may correspond to the classifier 110 of FIG. 1 and the classifier 220 of FIG. 2.

The user interface apparatus 1200 further includes partial optical flow generator 1261 . . . 1262 configured to generate optical flows of the plurality of classes, velocity component generators 1271 . . . 1272 configured to generate a plurality of velocity components based on the optical flows corresponding to the plurality of classes, and a relative velocity integrator 1280 configured to analyze a relative velocity by integrating the velocity components of the plurality of classes.

The user interface apparatus 1200 further includes a context generator 1285 configured to generate a user input context. The user interface apparatus 1200 further includes a user interface generator 1290 configured to provide a user interface based on a correlation of the relative velocity, the representative values of the plurality of classes, and the like.

The descriptions provided with reference to FIGS. 1 through 11B may apply to each module illustrated in FIG. 12 and thus, duplicated descriptions will be omitted for conciseness.

Further, while an example that includes partial optical flow generators 1261 . . . 1262 is illustrated in FIG. 12 for conciseness, to process auditory events, touch events or non-optical events, a touch flow calculator or sound flow calculator that operates substantially in the same manner as the partial optical flow generators 1261 . . . 1262 may be used to perform calculations with respect to the auditory events, touch events and other non-optical events.

Figure 13:
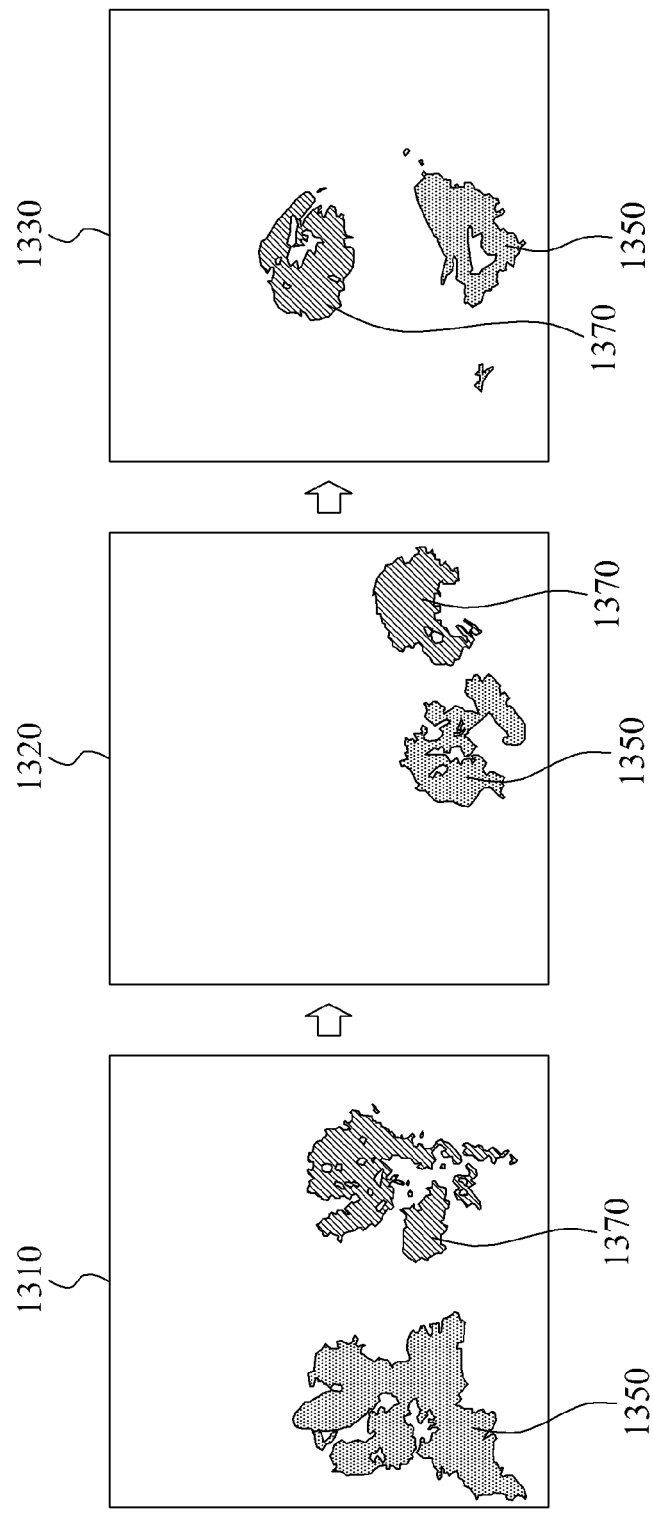
FIG. 13 is a diagram illustrating an example of a method of tracking objects.

FIG. 13 illustrates an example of an operation of tracking objects.

Referring to FIG. 13, a user interface apparatus may track a first class 1350 corresponding to a left hand and a second class 1370 corresponding to a right hand of a user with respect to each event. The user interface apparatus may track an ID of a class of a classified event and an updated representative value, for example, center coordinates of the corresponding class, thereby tracking postures, orientations, and positions of both hands of the user that are changed with time, as shown in images 1310, 1320, and 1330. Such a user interface apparatus may be applicable to various applications.

Figure 14:
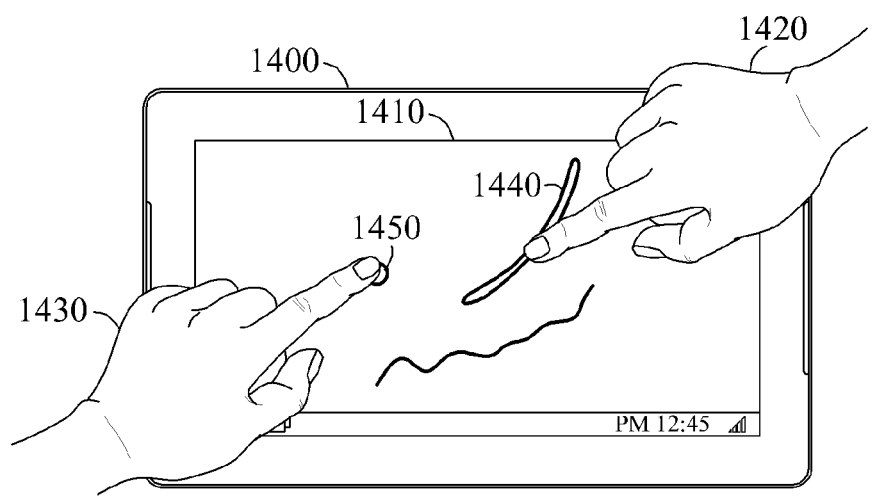
FIG. 14 is a diagram illustrating another example of an apparatus for user interface.

FIG. 14 illustrates another example of a user interface apparatus 1400 that provides a user interface based on the detection of an event. The user interface apparatus 1400 includes an event-based touch sensor 1410. In this example, the event-based touch sensor 1410 corresponds to a touch screen of a mobile device; however, the event-based touch sensor is not limited to a touch screen. Various sensors capable of detecting touch may be used to determine the occurrence of a touch event. In the illustrated example, the event-based touch sensor 1410 detects an event based on the movement of a finger of one hand 1420 of the user on the touch screen. The other hand 1430 of the user may be stationary or moving on the touch screen. In the illustrated example, the touch sensor 1410 detects a stationary touch corresponding to spot 1450. On the other hand, the finger of the right hand 1420 is generating touch events as the finger moves along a trajectory 1440.

A classifier of the user interface apparatus 1400 may classify the event generated by the moving hand 1420 as an event that corresponds to one class among a plurality of predetermined classes, based on the position or coordinates of the touch screen in which the touch event occurs. In the illustrated example, the two classes may correspond to touches generated by the two hands 1420, 1430. The trajectory 1440 of the finger of the moving hand 1420 produces events that results in an updating of the representative values of the class corresponding to the moving hand 1420. The event map generated by the updating may be similar to the event map 400 illustrated in FIG. 4. A processor may process the event map to determine the user input. The detailed description of components of the user interface apparatuses and methods described with respect to FIGS. 1-13 apply to the apparatus 1400.

While an example in which only one hand is moving has been illustrated for simplicity, the apparatus 1400 may be configured to detect the simultaneous movement of both hands on the touch screen. Also, the moving objects are not limited to hands or fingers, but may include animate and inanimate objects for which a touch event may be detected by an event-based touch sensor.

Figure 15:
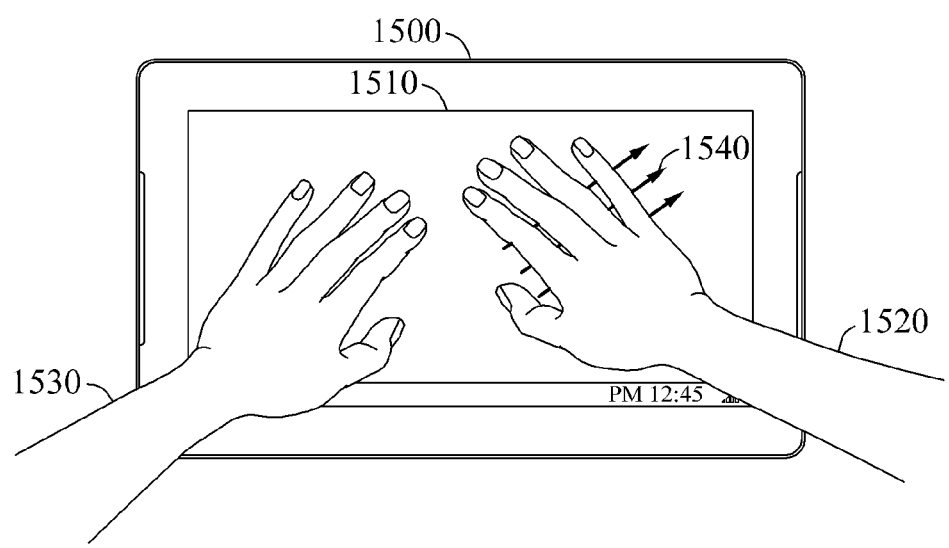
FIG. 15 is a diagram illustrating yet another example of an apparatus for user interface.

FIG. 15 illustrates another example of an apparatus 1500 for providing a user interface. The apparatus 1500 is configured to detect the movement of a palm and fingers of one hand 1520 across the surface of a touch screen that functions as an event-based touch sensor 1510. Based on the change in coordinates or positions of the area that is generating the touch event due to the movement of the hand 1520, the apparatus 1500 may interpret the desired user input. For example, the stationary hand 1530 and the moving hand 1520 may be interpreted as a command to zoom in, and a repeated movement of the moving hand 1520 may be interpreted as a command to erase graphic information on a portion of the screen. The description of examples of user interface apparatuses and methods described with respect to FIGS. 1-14 apply to the user interface apparatus 1500, and the detailed description thereof is omitted for conciseness.

Figure 16A:
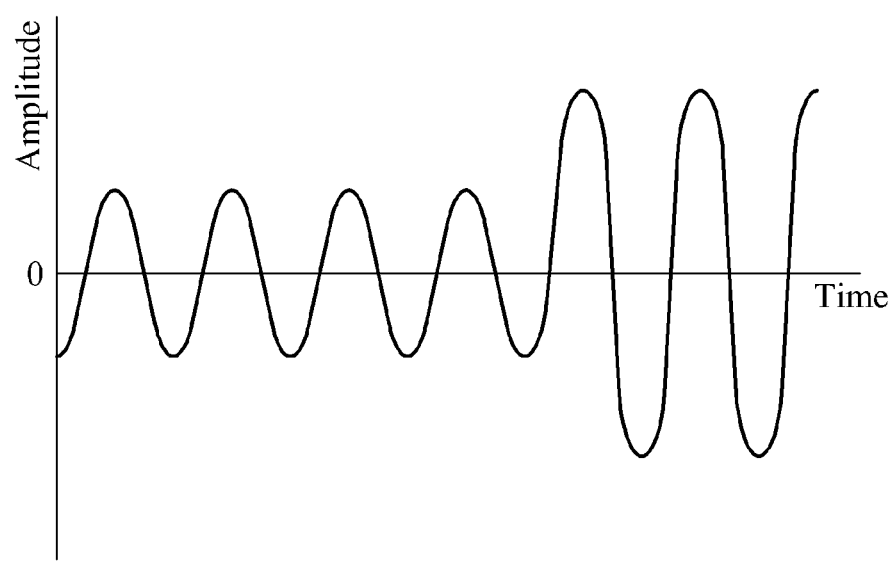
FIGS. 16A and 16B are diagrams illustrating another example of a method of providing a user interface.
Figure 16B:
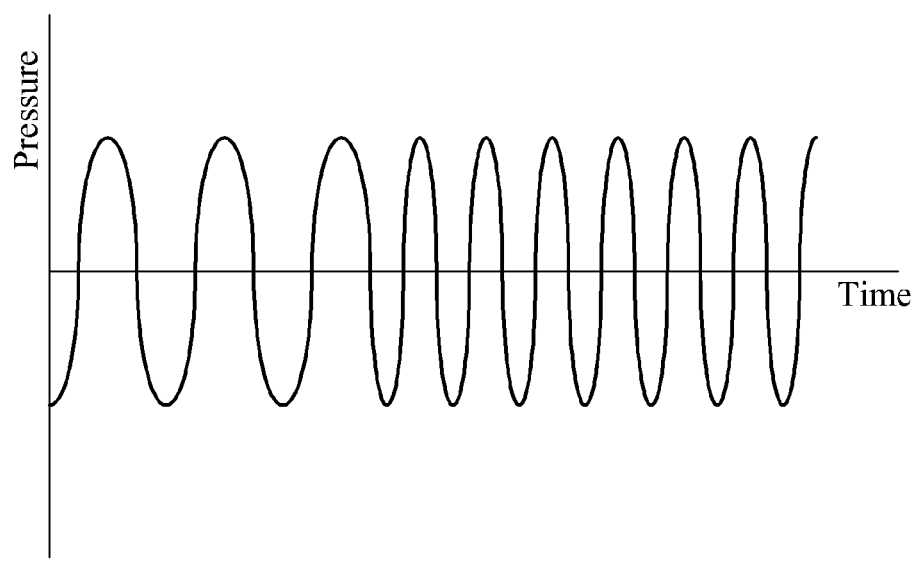

FIGS. 16A and 16B relate to an example of a method of providing a user interface based on a sound changing event.

The method of providing the user interface utilizes an event-based sound sensor to detect changes in a received sound, such as a change in an amplitude, frequency or intensity of the sound. The graph in FIG. 16A illustrates an increase in amplitude of a sound within a predetermined frequency band. The graph in FIG. 16B illustrates a change in the frequency of a sound, which corresponds to a change in pitch of the sound. The detected amplitude, frequency and/or intensity may be each converted to values that relate to the loudness, pitch or other characteristics of the detected sound, and be used to map an event map, similar to coordinates or indices used by a user interface apparatus that detects a change in brightness of pixels or touch.

Figure 17:
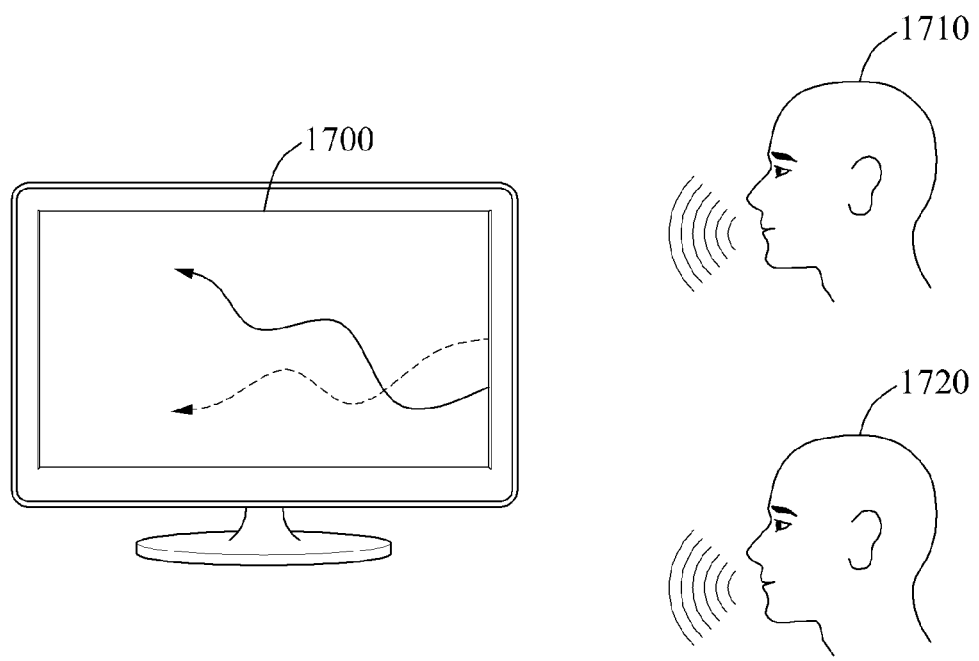
FIG. 17 is a diagram illustrating another example of an apparatus for user interface.

FIG. 17 illustrated another example of a user interface apparatus 1700. The user interface apparatus 1700 includes an event-based sound sensor that allows the apparatus 1700 to track the pitch and loudness of voices produced by two users 1710, 1720. By changing the pitch and loudness of their voice, the two users 1710, 1720 may, for example, produce a graphic image on the screen of the apparatus 1700. For instance, the user interface apparatus 1700 may allow the users 1710, 1720 to play a video game that determines the vocal abilities of the users 1710, 1720 by sing a song. While a number of applications of the user interface technology have been illustrated with respect to the drawings, the applications of the disclosed method and apparatus for providing user interface are not limited thereto. Various applications that track a direction of change in an environmental stimulus may be obtained with the described methods and apparatuses.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing to instructions in a defined manner. The processing device may run an operating system (OS) and one or more software applications that run on the OS. The processing device also may access, store, manipulate, process, and create data in response to execution of the software. Data may be stored in a memory. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for processing event data, the apparatus comprising:
   at least one event-based vision sensor configured to detect an event corresponding to a change of light by a movement of an object and to generate the event data associated with the change of light; and
   one or more processors configured to:
      determine a class, from among at least two classes, having a representative value most similar to the event data, based on respective similarities being calculated between the event data and corresponding representative values for each of the at least two classes;
      classify the event as corresponding to the class among the at least two classes, based on a result of the determining of the class having the representative value most similar to the event data;
      update class information related to the class corresponding to the event; and
      determine a user input corresponding to the event based on the updated class information.

2. The apparatus of claim 1, wherein the representative values are coordinates or position-related information regarding each of the at least two classes.

3. The apparatus of claim 1, wherein, to classify the event, the one or more processors are configured to:
compare an event value corresponding to the event to the representative values; and
detect a class, from among the at least two classes, having a representative value most similar to the event value.

4. The apparatus of claim 1, wherein the updated class information comprises a representative value representing the class of the classified event.

5. The apparatus of claim 1, wherein the at least two classes correspond to at least two objects associated with the user input.

6. The apparatus of claim 1, wherein, to determine the user input, the one or more processors are configured to:
calculate optical flows corresponding to the at least two classes; and
calculate velocity components corresponding to the at least two classes based on the calculated optical flows.

7. The apparatus of claim 6, wherein the velocity components comprise at least one of:
a first velocity component at which an object generating the event moves in an x-axial direction on a virtual plane used to detect the event;
a second velocity component at which the object moves in a y-axial direction on the virtual plane;
a third velocity component at which the object moves in a direction orthogonal to the virtual plane; and
a fourth velocity component at which the object rotates on the virtual plane.

8. The apparatus of claim 6, wherein, to determine the user input, the one or more processors are configured to:
recognize the user input by analyzing the velocity components based on a user input context.

9. The apparatus of claim 6, wherein, to determine the user input, the one or more processors are configured to:
recognize the user input by analyzing a relative velocity between the class of the classified event and at least one remaining class based on the velocity components.

10. The apparatus of claim 1, wherein, to determine the user input, the one or more processors are configured to:
recognize the user input by analyzing a representative value representing the class of the classified event and a representative value representing at least one remaining class based on a user input context.

11. The apparatus of claim 1, wherein the one or more processors are configured to classify the event irrespective of other events.

12. The apparatus of claim 1, wherein the event data is generated in an asynchronous manner.

13. The apparatus of claim 1, wherein the event indicates a change occurrence in brightness with respect to a corresponding object.

14. The apparatus of claim 1, wherein the classifying includes classifying events to a corresponding class based on respective classifiers of the classes, and
wherein the updating of the class information includes updating a classifier of the corresponding class after each event is classified in the classifying.

15. A method of operating a user interface for processing event data generated by at least one event-based vision sensor configured to detect events, the method comprising:
receiving the events corresponding to changes of light by movements of a plurality of objects;
determine a corresponding class, from among a plurality of classes that correspond to the plurality of objects, having a representative value most similar to each of the events, based on respective similarities being calculated between each event, of the events, and corresponding representative values for each of the plurality of classes;
classifying each of the events as the corresponding class, based on the determining of the corresponding class having the representative value most similar to each of the events;
updating class information relating to the one or more of the classes based on the events; and
determining a user input based on the updated class information.

16. The method of claim 15, wherein the classifying comprises detecting, for each of the events, a class having a representative value most similar to a value of the corresponding event, among the plurality of classes.

17. The method of claim 15, wherein the class information comprises at least one of pixels included in the classes, events included in the classes, and representative values of the classes stored in a memory.

18. The method of claim 15, wherein the determining of the user input based on the updated class information further comprises:
calculating optical flows for the classes;
calculating velocity components of the classes based on the calculated optical flows; and
recognizing a command to process the user input based on the velocity components of the classes.

19. An apparatus for processing event data, the apparatus comprising:
at least one event-based vision sensor configured to detect an event corresponding to a change of light by a movement of an object and to generate the event data associated with the change of light; and
one or more processors configured to:
determine a class, from among at least two classes, having a representative value most similar to the event data, based on respective similarities being calculated between the event data and corresponding representative values for each of the at least two classes;
classify the event as corresponding to an object, among a plurality of objects, being associated with the class, based on a result of the determining of the class having a representative value most similar to the event data;
update representative values corresponding to at least one of the plurality of objects based on the classified event; and
determine a user input corresponding to the event based on the updated representative values.

20. The apparatus of claim 19, wherein the representative values are coordinates or position-related information regarding each of the at least two classes, or to frequency, amplitude or intensity related information regarding each of the at least two classes.

21. The apparatus of claim 19, wherein, to determine the user input, the one or more processors are configured to determine the user input by determining a direction of change regarding one or more of the plurality of objects based on the updated representative values.

22. An apparatus for processing event data, the apparatus comprising:
at least one event-based vision sensor configured to detect an event corresponding to a change of light by a movement of an object and to generate the event data associated with the change of light; and
one or more processors configured to:

calculate a first similarity between the event data and a first representative value, wherein the first representative value corresponds to a first group of events detected by the event-based vision sensor;

calculate a second similarity between the event data and a second representative value, wherein the second representative value corresponds to a second group of events detected by the event-based vision sensor;

compare the first similarity and the second similarity with each other;

classify the event as one of the first group of events and the second group of events, based on a result of the comparison; and update the first representative value or the second representative value, based on the classified event.

23. The apparatus of claim 22, wherein the event data includes a target coordinate of a target pixel, from among a plurality of pixels included in the event data, at which the event occurred, wherein the first representative value is a first center coordinate of a first group of pixels, from among a plurality of pixels, which generate the first group of events, and wherein the second representative value is a second center coordinate of a second group of pixels, from among a plurality of pixels, which generate the second group of events.

24. The apparatus of claim 23, wherein the first similarity is a first distance between the target coordinate and the first center coordinate, and the second similarity is a second distance between the target coordinate and the second center coordinate.

25. The apparatus of claim 24, wherein the one or more processor further configured to:

classify the event as the first group of events, when the second distance is greater than the first distance; and classify the event as the second group of events, when the first distance is greater than the second distance.

* * * * *